UNITED STATES PATENT OFFICE.

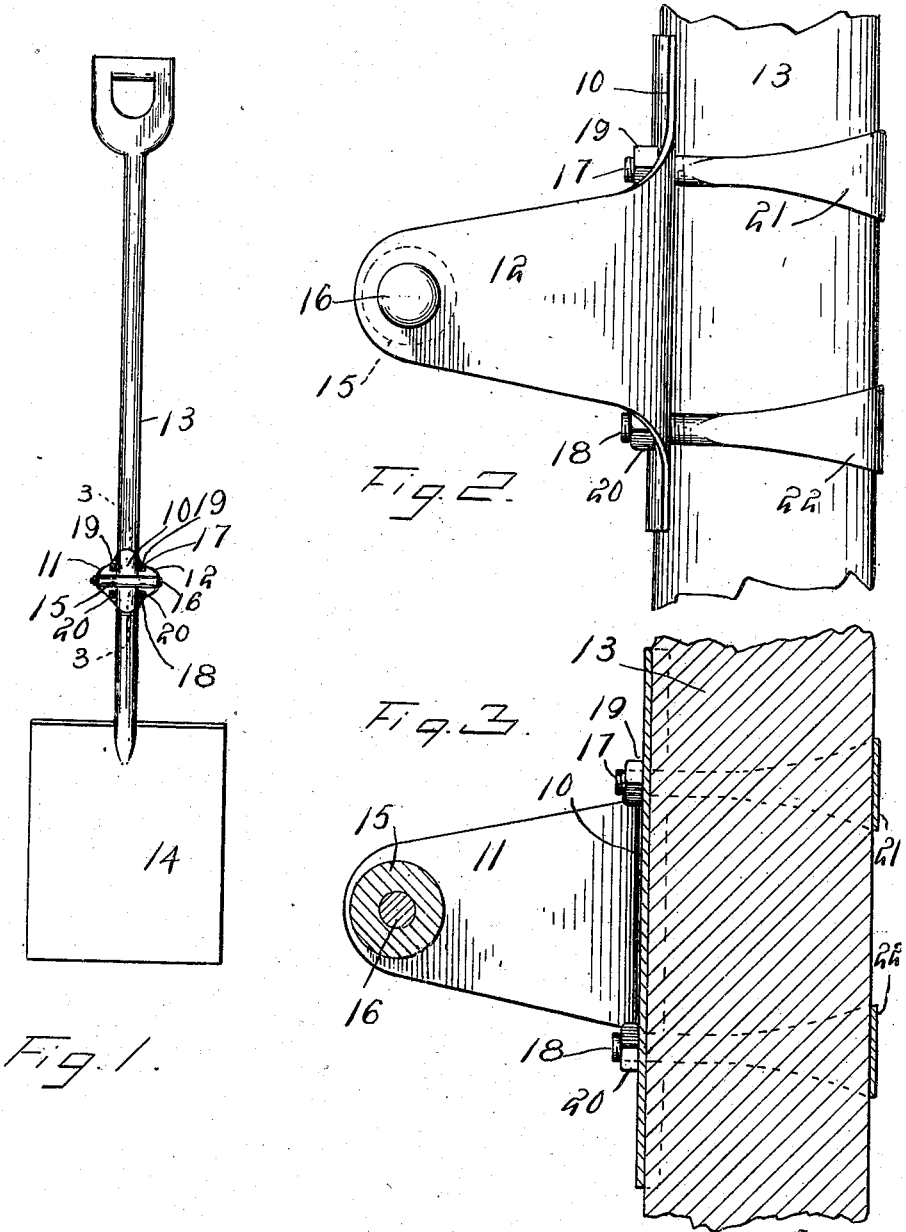

CHRISTIAN PETER PAULSEN, OF BRADLEY, SOUTH DAKOTA.

AUXILIARY IMPLEMENT-HANDLE.

No. 923,994.  Specification of Letters Patent.  Patented June 8, 1909.

Application filed September 25, 1908. Serial No. 454,719.

*To all whom it may concern:*

Be it known that I, CHRISTIAN PETER PAULSEN, a citizen of the United States, residing at Bradley, in the county of Clark, State of South Dakota, have invented certain new and useful Improvements in Auxiliary Implement-Handles; and I do hereby declare the following to be a full, clear, and exact description of the invention, such as will enable others skilled in the art to which it appertains to make and use the same.

This invention relates to detachable or auxiliary handles adapted to be applied to the handles of shovels, spades, pitchforks, and the like, and has for one of its objects to simplify and improve the construction and increase the efficiency and utility of devices of this character.

Another object of the invention is to provide a simply constructed device of this character which may be readily applied to handles of various forms and which will not work loose or abrade or injure the handle to which it is attached.

With these and other objects in view, the invention consists in a relatively long plate having a concaved bearing face for engagement with the handle on one side and with lateral ears extending from its sides intermediate the ends and connected at their free ends by a hand grip element and with U-shaped bolts connected by their ends through the plate between the ends thereof and the ears and engaging around the implement handle, whereby the plate is firmly coupled to the handle and the strains distributed over a relatively large area.

The invention further consists in certain novel features of construction as hereafter shown and described and then specifically pointed out in the claims, and in the drawings illustrative of the preferred embodiment of the invention, Figure 1 is a front elevation of a conventional shovel with the improvement applied. Fig. 2 is a side view enlarged of a portion of a shovel handle with the improvement applied. Fig. 3 is a section enlarged on the line 3—3 of Fig. 1.

In using spades, shovels, pitchforks and similar implements much difficulty is encountered by the operator in holding the implement from being prematurely overturned owing to the fact that the grip of the left hand is not ordinarily of sufficient strength to prevent this objectionable action.

The principal object of the present invention is to provide a simply constructed attachment which may be applied to any of the various implements enumerated, and by means of which the grip of the left hand of the operator is made more effective and the grip disposed in a more convenient manner, so that the strains incident to the tendency of the implement to overturn when carrying its load are overcome by the resistance of the left hand.

The improved attachment comprises a relatively long reduced plate 10 having ears 11—12 extending over its side edges intermediate the ends, the lower face of the plate being concaved longitudinally to correspond with the handle of the implement with which it is to be connected, for the purpose of illustration a handle 13 of a shovel 14. The free ends of the ears 11—12 are connected by a hand grip element preferably in the form of a roller 15 connected in place by a bolt or rivet 16 extending through the ears and likewise through the roller, as shown.

Engaging around the handle 13 are two U bolts 17—18 with their ends extending through the plate 10 and provided with nuts 19—20, by which means the U bolts may be firmly clamped in place. The U bolts, it will be noted, pass through the plate 10 between the ears 11—12 and the terminals of the plate, leaving relatively large portions of the plate extending beyond the U bolts and the U bolts are spaced a considerable distance apart, whereby the bearing strains are distributed over a relatively long portion of the handle. The U bolts are spaced at substantially equal distance from the ears 11—12 and the hand grip member 15, so that the strains exerted upon the handle will be applied to the U-bolts at two portions of the handle spaced a relatively large distance apart, whereby the tendency of the U bolts to abrade the handle is obviated. The central or "bend" portions of the U bolts are flattened, as shown at 21—22 where they come in contact with the handle 13, thereby materially increasing the bearing surface of the implement, thus still further decreasing the tendency of the attachment to abrade or wear into the relatively soft material of the handle when the implement is in use.

The relatively long plate 10 with the ears extending therefrom intermediate the ends and the U bolts engaging upon the handle between the ends of the plate and the hand grip supporting ears is an important feature of the invention as the spaced clips or U bolts 17—18 effectually prevent the handle from being abraded by the strains, as before stated, and thus effectually prevent the attachment from working loose under the severe strains to which it will be subjected.

The plate 10 together with its ears 11—12 will preferably be struck up from a single sheet of metal, preferably steel, and will be as light as possible consistent with the strains to which it will be subjected.

The improved device is simple in construction, can be inexpensively manufactured and it may be applied without material structural changes to handles of various sizes and forms, and will add materially to the value, and efficiency of the implement without material increase in its cost or the purchase price.

What is claimed is:—

1. An improved article of manufacture comprising an elongated plate having a concaved bearing and with laterally directed ears projecting centrally from the sides, a hand grip element extending between the ears, and U bolts spaced apart and likewise spaced from the ends of the plate and connected by their terminals through the plate between the ears and the ends of the same, said plate adapted to bear upon an implement handle and said U bolts adapted to engage around the same, whereby an extended bearing surface is provided and the strains distributed over a correspondingly extended surface.

2. An improved article of manufacture comprising an elongated plate having a concaved bearing and with laterally directed ears projecting centrally from the sides, a hand grip element extending between the ears, and U bolts spaced apart and likewise spaced from the ends of the plate and connected by their terminals through the plate between the ears and the ends of the same, said U bolts being flattened at their bends to increase the bearing area.

In testimony whereof, I affix my signature, in presence of two witnesses.

CHRISTIAN PETER PAULSEN.

Witnesses:
 ARCHIE EYVEL,
 E. A. SCHULLIAN.